United States Patent
Oh et al.

(10) Patent No.: US 8,616,987 B2
(45) Date of Patent: *Dec. 31, 2013

(54) CROSS GROOVE TYPE CONSTANT VELOCITY JOINT

(71) Applicant: Hyundai Wia Corporation, Changwon-shi (KR)

(72) Inventors: Seung Tark Oh, Farmington Hills, MI (US); Tae Hong Kim, West Bloomfield, MI (US)

(73) Assignee: Hyundai Wia Corporation (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,663

(22) Filed: May 6, 2013

(65) Prior Publication Data

US 2013/0252747 A1    Sep. 26, 2013

Related U.S. Application Data

(62) Division of application No. 12/582,602, filed on Oct. 20, 2009, now Pat. No. 8,444,495.

(51) Int. Cl.
*F16D 3/223* (2011.01)

(52) U.S. Cl.
USPC .......................................... 464/144; 464/906

(58) Field of Classification Search
USPC ..................... 464/15, 140, 144, 146, 906
See application file for complete search history.

(56) References Cited

U.S. PATENT DOCUMENTS

| 2,322,570 | A  | * | 6/1943  | Dodge .......................... 464/144 |
| 3,237,429 | A  | * | 3/1966  | Henry-Biabaud ........ 464/146 X |
| 3,553,979 | A  | * | 1/1971  | Noguchi et al. ........... 464/906 X |
| 5,967,900 | A  | * | 10/1999 | Tanigaki ....................... 464/144 |
| 6,071,195 | A  | * | 6/2000  | Krude ........................... 464/144 |
| 6,497,622 | B1 | * | 12/2002 | Bilz et al. .................... 464/144 |
| 6,705,947 | B1 | * | 3/2004  | Hildebrandt et al. ..... 464/906 X |
| 7,008,326 | B2 | * | 3/2006  | Song ............................ 464/144 |
| 7,347,786 | B2 | * | 3/2008  | Mondragon-Parra et al. ............................ 464/144 |
| 7,407,441 | B2 | * | 8/2008  | Matsumoto et al. ...... 464/906 X |
| 7,632,190 | B2 | * | 12/2009 | Nakao et al. ............... 464/906 X |
| 8,444,495 | B2 | * | 5/2013  | Oh et al. ...................... 464/144 |
| 2007/0202958 | A1 | * | 8/2007 | Ichikawa |

* cited by examiner

*Primary Examiner* — Gregory Binda
*Assistant Examiner* — Matthieu Setliff
(74) *Attorney, Agent, or Firm* — Park & Associates IP Law, P.C.

(57) ABSTRACT

A constant velocity joint for a drive system includes: an outer joint member and an inner joint member, each having a plurality of ball grooves, the ball grooves consisting of a first group of grooves of a skewed groove shape with a first skew angle other than zero and alternately arranged in opposite directions relative to an axis of rotation of the outer and inner joint members, and a second group of grooves of a skewed groove shape with a second skew angle other than zero and alternately arranged in opposite directions relative to an axis of rotation of the outer and inner joint members, the second skew angle less than the first skew angle. In addition to the differentiated skew angles, the contact angles of the balls in the first and second group of grooves may also be differentiated.

4 Claims, 11 Drawing Sheets

Section A-A (a)          (b)          (c)

Section B-B (a)          (b)          (c)

(a)

(b)

(c)

(a)

(b)

(a)

(b)

CROSS GROOVE TYPE CONSTANT VELOCITY JOINT

REFERENCE TO RELATED APPLICATIONS

This is a divisional of U.S. patent application Ser. No. 12/582,602 filed on Oct. 20, 2009, now U.S. Pat. No. 8,444,495, the entire contents of which are incorporated herein by reference.

FIELD OF THE INVENTION

The present invention relates to a cross groove type constant velocity joint for use in a drive system, and more particularly, to a cross groove type constant velocity joint having composite groove shapes, typically for use in a drive system of, for example, an automobile for transmitting rotational torque between two rotating shafts thereof.

BACKGROUND OF THE INVENTION

A cross groove type constant velocity joint (hereinafter to be referred as a "cross groove joint") is one type of constant velocity universal joints used for transmitting rotational torque between the rotating shafts (i.e., the driving shaft and the driven shaft), typically for the drive system of automobiles. The cross groove joint includes an outer joint member with a plurality of ball grooves formed on the inner surface thereof, and an inner joint member with a plurality of ball grooves formed on the outer surface thereof, in which the corresponding ball grooves of the outer joint member and the inner joint member are configured to pair with each other and slanted with the same skew angle and in opposite directions with respect to the center or rotating axis of the joint.

FIGS. 1-2 illustrate one example of a conventional cross groove type joint which retains six balls in the ball grooves for transmitting the rotational torque between the outer and inner joint members to drive the drive system. This cross groove joint includes an outer joint member 1 with six grooves formed on the inner surface thereof, an inner joint member 3 with six grooves formed on the outer surface thereof, six balls 2 retained in the pared grooves of the outer and inner joint members for torque transfer between the outer and inner joint members 1 and 3, and a cage 4 configured to support the balls 2 to a plane bisecting the angle of articulation between the axes of rotation of the outer and inner joint members 1 and 3.

In the structure of the conventional cross groove joint as shown in FIG. 2, the outer joint member 1 has a plurality of (i.e., six) inwardly facing outer ball grooves 1*a* alternately skewed with a skew angle δ in opposite directions relative to an axis of rotation of the outer joint member 1. The inner joint member 3 positioned inside the outer joint member 1 has a plurality of (i.e., six) outwardly facing inner ball grooves 3*a* alternately skewed with the same skew angle δ in opposite directions relative to an axis of rotation of the inner joint member 3. The outer and inner ball grooves 1*a* and 3*a* face each other in crossed pairs with each of the balls 2 positioned between each crossed pair for torque transfer between the inner and outer joint members 1 and 3. As the ball 2 is retained in the cage 4, the ball 2 is limited in a ball movement range L2 in the circumferential direction of the joint, and the outer joint member 1 has a minimum thickness L1 on one side of the member. To secure the movement of the balls 2, the cage 4 includes a plurality of (i.e., six) cage windows 4*a* with a dimension sufficient to accommodate the ball movement L2. As a result, the width L4 of each cage web 4*b* must be designed to have a dimension at least the same or less than the minimum thickness L1 of outer joint member 1.

In an attempt to reduce a transmission error and to make the design of the joint more compact, the cross groove joints retaining eight balls have been suggested. The eight-ball type cross groove joint known in the art typically has a basic structure generally the same or similar to that shown in FIGS. 1-2, however, with the number of the balls and the number of the ball grooves of the outer and inner joint members respectively increased from six to eight. FIGS. 3(*a*) and (*b*) illustrate a conventional cross groove joint with eight balls. Like the six ball cross groove joint, the eight ball cross groove joint includes an outer joint member 11, an inner joint member 33, balls 22 for torque transfer between the outer and inner joint members, and a cage 44 configured to support the balls to a plane bisecting the angle of articulation between the axes of rotation of the outer and the inner joint member.

In the structure of the conventional eight ball type cross groove joint as shown in FIG. 4, the outer joint member 11 has a plurality of inwardly facing outer ball grooves 11*a* alternately skewed with a skew angle δ in opposite directions relative to an axis of rotation of the outer joint member. The inner joint member 33 placed inside the outer joint member 11 similarly has a plurality of (i.e., eight) outwardly facing inner ball grooves 33*a* alternately skewed with the same skew angle δ, however, oriented in opposite directions relative to an axis of rotation of inner joint member 33. The outer and inner ball grooves 11*a* and 33*a* face each other in crossed pairs with each of the balls 22 retained between each crossed pair for torque transfer between the inner and outer joint members. As the ball 22 is retained in the cage 44, the ball 22 is limited in a ball movement range L22 in the circumferential direction of the joint, and the outer joint member 11 has a minimum (least) thickness L11 on one side of the member. To secure the movement of the balls 22, the cage 44 includes a plurality of (i.e., eight) cage windows 44*a* with a dimension sufficient to accommodate the ball movement L22. As a result, the width L44 of each cage web 44*b* must be designed to have a dimension the same or less than the minimum thickness L11 of outer joint member 11.

As the cross groove joint with higher balls (e.g., eight or more balls) can provide more compact design and secure a smoother and reliable operation as compared to the cross groove joint with six balls, it would be desirable to produce a higher ball (e.g., eight or more balls) type cross groove joint which has the same or equivalent durability as that having six balls. More specifically, if the cross groove joint with eight balls, for example, is designed to have the same pitch circle diameter (PCD) as the joint having six balls, the ball diameter of the eight ball joint can be reduced because the load on each ball groove and the stress onto the cage web 44*b* decreases by the increase of the number of the balls. In addition, the size of each cage window 44*a* can also be reduced compared to the joint containing six balls.

However, the higher ball (e.g., eight ball) type cross groove joint may also include certain shortcomings or disadvantages as described below, for example. Because the eight ball type joint includes more (i.e., eight) cage windows 44*a*, the thickness of the cage web 44*b* is also reduced, and thus, the stress on the cage web 44*b* becomes greater than that of the six ball type. Comparing to the joint with six balls having the same PCD, the increased amount of stress on the cage web (due to the reduction of cage web thickness) exceeds that of the decreased amount of stress owing to the increase of the number of balls. Therefore, the higher ball (e.g., eight ball) type cross groove joint may have a weakened strength and durability in the cage web, and thus, the load bearing capacity of the joint can be deteriorated than that of the conventional six ball type joint.

SUMMARY OF THE INVENTION

In order to solve the above described and other shortcomings or drawbacks known in the conventional cross groove joints, the present invention provides a cross groove joint (preferably, but not necessarily, of higher ball type) with a compact and durable structure, in particular, with the strength of the cage web enhanced than that of the conventional cross groove joints as described above.

In order to provide an enhanced strength to the cage web of the cross groove joint, the present invention provides a cross groove joint including an outer joint member with a plurality of inwardly facing ball grooves and an inner joint member with a plurality of outwardly facing ball grooves, in which the shapes of the ball grooves of the outer and inner joint members are configured to increase the thickness and also the mechanical strength of the cage web as compared to the conventional cross groove joint as described above.

The mechanical strength and durability of the cage is influenced by skew angle δ (see FIG. 4, for example). As the skew angle δ of the ball grooves for the outer and inner joint members 11 and 33 increases, the ball movement L22 in circumferential direction increases and the size of cage window 44a should also be increase to accommodate the ball movement in the movement range. As a consequence, the thickness of cage web 44b between two adjacent windows 44a becomes smaller as the skew angle of the grooves for the inner and outer joint member increases. Therefore, considering all the factors described above, the applicant of the present application discovered several effective ways to reduce the ball movements and the size of cage windows in the cross groove joint (preferably, but not necessarily, of the type having eight or more balls) by decreasing or optimizing the skew angle and also optimizing the shapes of the ball grooves. U.S. patent application Ser. No. 12/563,029, filed Sep. 18, 2009 by the same applicants of the present application, suggests several examples of the constant velocity joints incorporating composite groove patterns (for example, such as a combination of liner and non-linear grooves, or of skewed grooves and non-linear grooves) to the ball grooves of the outer and inner joint members to provide an enhanced strength and durability comparing to the conventional cross groove type joint.

The present application provides a cross groove type constant velocity joint having outer and inner joint members with different groove configurations to the ball grooves of the outer and inner joint members to provide an enhanced strength and durability comparing to the conventional cross groove type joint. According to one aspect of the present invention, the ball grooves of the outer and inner joint members are configured to have two groups of skewed grooves composed of a first group with a skew angle as same as or similar to the skew angle (δ) of the conventional groove type joint (as shown in FIG. 4 for example) and a second group with a reduced skew angle which is less than the skew angle (δ) of the conventional groove type joint. As a result, the minimum thickness (L11) of the outer and inner joint members and the thickness of the cage web can be enlarged relative to the conventional groove type joint having the alternately arranged skewed grooves of the same skew angle (δ). Accordingly, the joint of the present invention can provide an enhanced strength and durability over the conventional cross groove type joint.

As described below in association with the eight ball type joint, for example, in order for the eight ball cross groove joint to secure the strength and durability of the cage to the level similar or equivalent to that of the six ball cross groove joint having the same pitch circle diameter (PCD), the skew angle is reduced and the minimum thickness (least effective thickness) of the outer and inner joint members (and thus, the thickness of the cage web as well) are maximized as compared to the conventional joint described above without any degradation of functions in the joint.

According to one preferred embodiment of the invention, a cross groove type constant velocity joint for a drive system comprises:

an outer joint member having a plurality of inwardly facing outer ball grooves, the outer ball grooves consisting of a first group of grooves, each groove of which having a skewed groove shape with a first skew angle other than zero and alternately arranged in opposite directions relative to an axis of rotation of outer joint member, and a second group of grooves, each groove of which having a skewed groove shape with a second skew angle other than zero and alternately arranged in opposite directions relative to an axis of rotation of outer joint member, the second skew angle less than the first skew angle;

an inner joint member disposed inside the outer joint member and having a plurality of outwardly facing inner ball grooves consisting of a first group of grooves, each groove of which having a skewed groove shape with a first skew angle other than zero and alternately arranged in opposite directions relative to an axis of rotation of inner joint member, and a second group of grooves, each groove of which having a skewed groove shape with a second skew angle other than zero and alternately arranged in opposite directions relative to an axis of rotation of inner joint member, the second skew angle less than the first skew angle, each inner ball groove of the inner joint member being coupled with a corresponding outer ball groove of the outer joint member generally in crossed pair;

a plurality of torque transfer balls which are guided by the ball groove faces of the outer and inner joint members; and a cage having circumferentially displaced windows to accommodate the balls therein.

According to another aspect of the present invention, the shapes and configurations of the outer and inner joint members (including the ball grooves thereof) are further modified to provide an enhanced strength and durability, while also capable of reducing frictions and transmission errors in the joint causable by rotational backlash when using two groups of skewed grooves, one group with regular skew angles and the other with reduced skew angles. In order to resolve the potential risks of increasing the rotational backlash due to the reduced skew angle in the second group of grooves (which will be discussed below in details), the applicants discovered that the rotational backlash can be decreased as the contact angle between the ball and the ball groove for the inner and outer joint members increases and as the skew angle of the ball grooves increases. The applicants further discovered that the rotational backlash can also be decreased as the pitch circle diameter (PCD) increases. Based on these findings, the applicants further discovered several effective ways (as described below in details with reference to FIGS. 6-11) to reduce the rotational backlash in the ball grooves, while also maintaining a similar or equivalent strength and durability of the joint.

According to one preferred embodiment of the invention, a cross groove type constant velocity joint for a drive system comprises:

an outer joint member having a plurality of inwardly facing outer ball grooves, the outer ball grooves consisting of a first group of grooves, each groove of which having a skewed groove shape with a first skew angle other than zero and alternately arranged in opposite directions relative to an axis of rotation of outer joint member, and a second group of grooves, each groove of which having a skewed groove shape with a second skew angle other than zero and alternately arranged in opposite directions relative to an axis of rotation of outer joint member, the second skew angle less than the first skew angle;

an inner joint member disposed inside the outer joint member and having a plurality of outwardly facing inner ball grooves consisting of a first group of grooves, each groove of which having a skewed groove shape with a first skew angle other than zero and alternately arranged in opposite directions relative to an axis of rotation of inner joint member, and a second group of grooves, each groove of which having a skewed groove shape with a second skew angle other than zero and alternately arranged in opposite directions relative to an axis of rotation of inner joint member, the second skew angle less than the first skew angle, each inner ball groove of the inner joint member being coupled with a corresponding outer ball groove of the outer joint member generally in crossed pair;

a plurality of torque transfer balls which are guided by the ball groove faces of the outer and inner joint members; and a cage having circumferentially displaced windows to accommodate the balls therein;

wherein the first group of grooves of the outer and inner joint members are configured to have a first contact angle between its ball and ball groove, respectively, and the second group of grooves of the outer and inner joint members are configured to have a second contact angle between its ball and ball groove, respectively, and wherein the second contact angle is selected to have an angle larger than the first contact angle.

According to another preferred embodiment of the invention, a cross groove type constant velocity joint for a drive system comprises:

an outer joint member having a plurality of inwardly facing outer ball grooves, the outer ball grooves consisting of a first group of grooves, each groove of which having a skewed groove shape with a first skew angle other than zero and alternately arranged in opposite directions relative to an axis of rotation of outer joint member, and a second group of grooves, each groove of which having a skewed groove shape with a second skew angle other than zero and alternately arranged in opposite directions relative to an axis of rotation of outer joint member, the second skew angle less than the first skew angle;

an inner joint member disposed inside the outer joint member and having a plurality of outwardly facing inner ball grooves consisting of a first group of grooves, each groove of which having a skewed groove shape with a first skew angle other than zero and alternately arranged in opposite directions relative to an axis of rotation of inner joint member, and a second group of grooves, each groove of which having a skewed groove shape with a second skew angle other than zero and alternately arranged in opposite directions relative to an axis of rotation of inner joint member, the second skew angle less than the first skew angle, each inner ball groove of the inner joint member being coupled with a corresponding outer ball groove of the outer joint member generally in crossed pair;

a plurality of torque transfer balls which are guided by the ball groove faces of the outer and inner joint members; and a cage having circumferentially displaced windows to accommodate the balls therein;

wherein the first group of grooves of the outer and inner joint members are configured to have a first contact angle between its ball and ball groove, respectively, and the second group of grooves of the outer and inner joint members are configured to have a second contact angle between its ball and ball groove, respectively, and wherein the second contact angle is selected to have an angle larger than the first contact angle;

wherein the first group of grooves of the outer and inner joint members are configured to have a first pitch circle diameter, and the second group of grooves of the outer and inner joint members are configured to have a second pitch circle diameter, and wherein the second pitch circle diameter is larger than the first pitch circle diameter;

wherein the balls received in the second group of grooves of the outer and inner joint members are smaller than the balls received in the first group of grooves of the outer and inner joint members.

According to the principles and further embodiments of the invention, the number of the torque transfer balls is an even number (for example, six, eight, ten, etc,), and the first skew angle of the outer joint member and the first skew angle of the inner joint member are selected to be in the range between about 10 degree and about 20 degree, and the second skew angle of the outer joint member and the second skew angle of the inner joint member are selected to be in the range between about 1 degree and about 10 degree, more preferably between about 2 degree and about 6 degree.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which.

DETAILED DESCRIPTION OF THE INVENTION

Figure 1A:
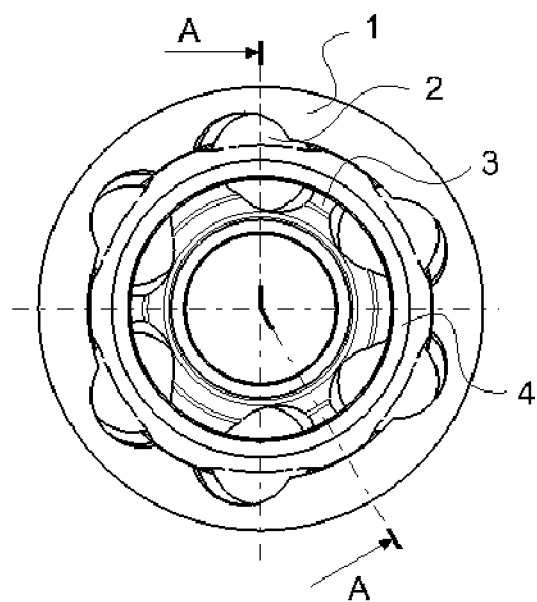
FIG. 1(a) is a view illustrating a conventional cross groove joint with six balls.
Figure 1B:
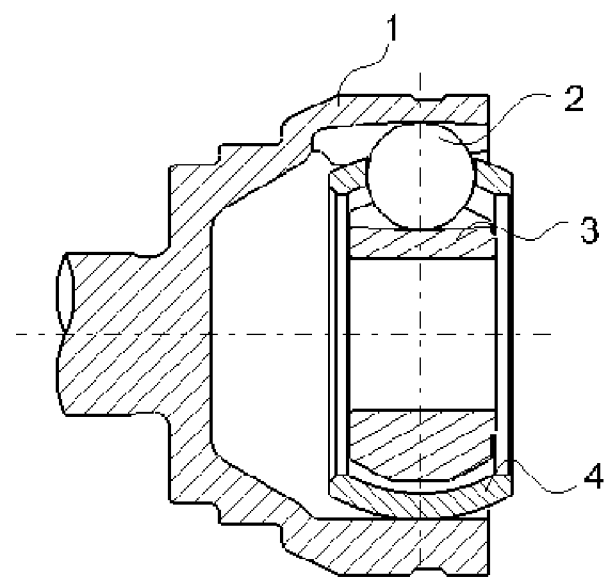
FIG. 1(b) is a cross-sectional view of the conventional cross groove joint as shown in FIG. 1(a), taken along line A-A in the figure.
Figure 2:
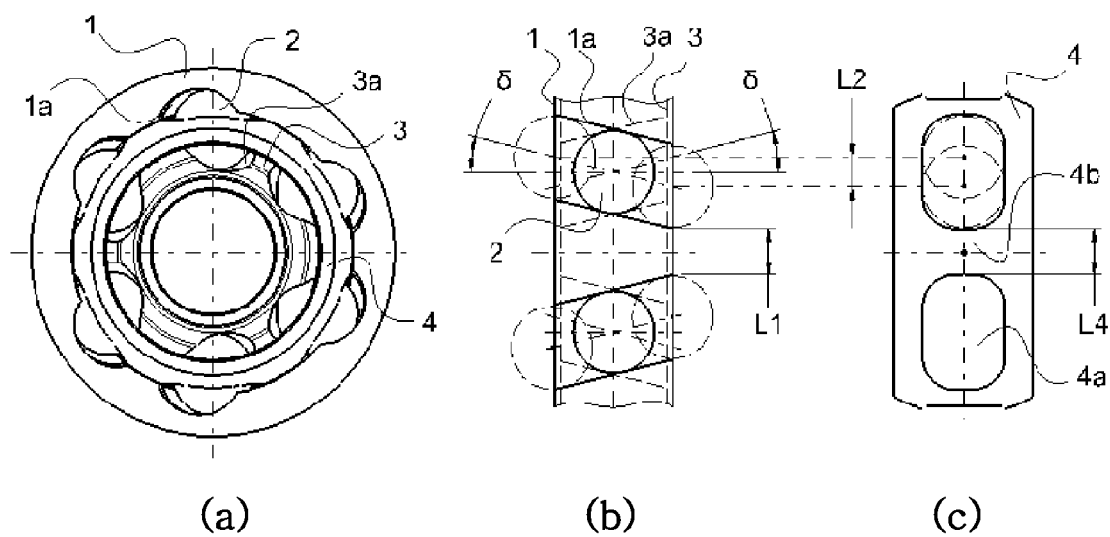
FIGS. 2(a)-2(c) are, respectively, a view of a conventional cross groove joint with six balls, a partial side view thereof for illustrating the shapes of the ball grooves in the outer and inner joint members and movements of the balls in the grooves, and a partial side view for illustrating movements of the balls in the cage.
Figure 3A:
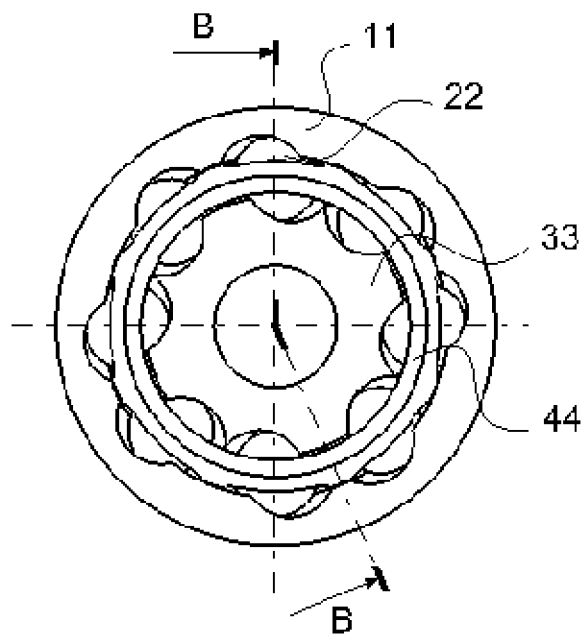
FIG. 3(a) is a view illustrating a conventional cross groove joint with eight balls.
Figure 3B:
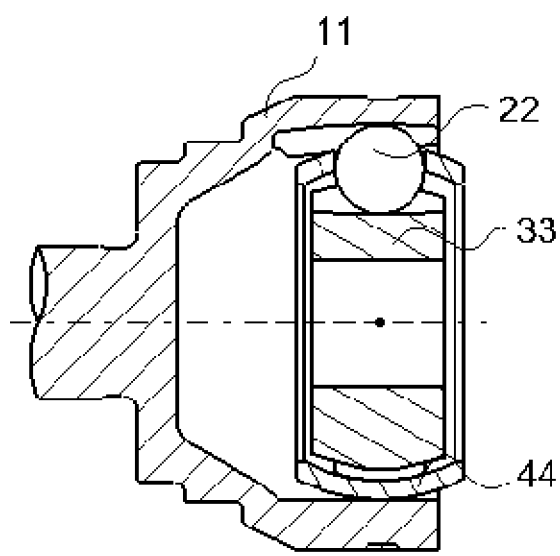
FIG. 3(b) is a cross-sectional view of the conventional cross groove joint as shown in FIG. 3(a), taken along line B-B in the figure.

The present invention will be explained and illustrated below in association with several embodiments to be described later, in particular, the cross groove joint of eight ball type. However, it is noted that the present invention is not limited to the eight ball type joint, but is applicable to the cross groove joint of any ball type, for example, having six, eight, ten, or more balls.

Referring to FIGS. 5-11 of the drawings, the cross groove type constant velocity joints of the present invention are described herein in details in association with several exemplary or preferred embodiments thereof. However, the following descriptions of such embodiments are intended primarily for illustrating the principles and exemplary constructions of the constant velocity joints of the present invention, and the present invention is not specifically limited to these exemplary embodiments. Thus, one skilled in the art can appreciate or recognize that various modifications and substitutions can be made thereto without departing from the spirit and scope of the present invention.

Throughout the description of the present application, common or similar elements are to be referred with the same or similar reference characters for simplicity purposes.

Figure 4:
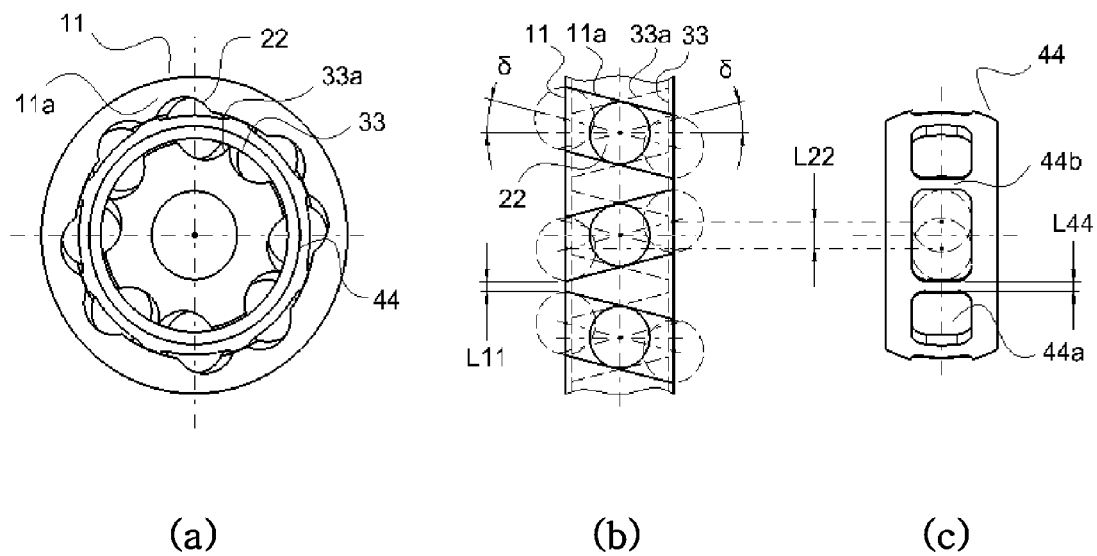
FIGS. 4(a)-4(c) are, respectively, a view of a conventional cross groove joint with eight balls, a partial side development (i.e., deployed or radially projected) view thereof for illustrating the shapes of the ball grooves in the outer and inner joint members and movements of the balls in the grooves, and a partial side view for illustrating movements of the balls in the cage.
Figure 5:
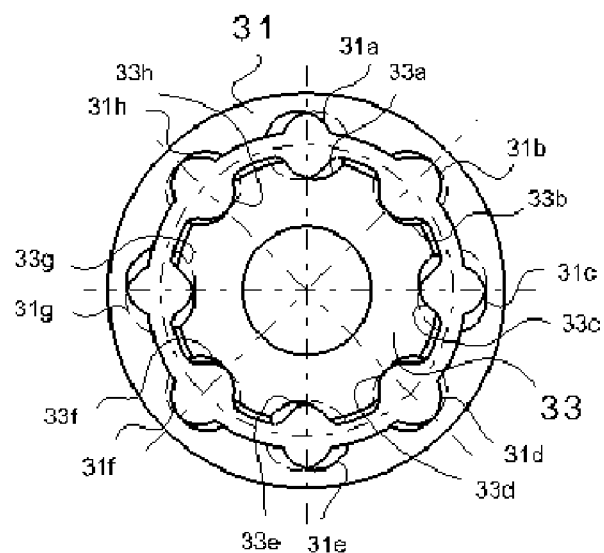
FIGS. 5(a)-5(c) are, respectively, a view of the cross groove type constant velocity joint with eight balls, constructed according to one preferred embodiment of the present invention, a side cross-sectional and development view (i.e., deployed or radially projected on a plane) of the outer joint member thereof, and a side cross-sectional and development view of the inner joint member thereof.
Figure 5:
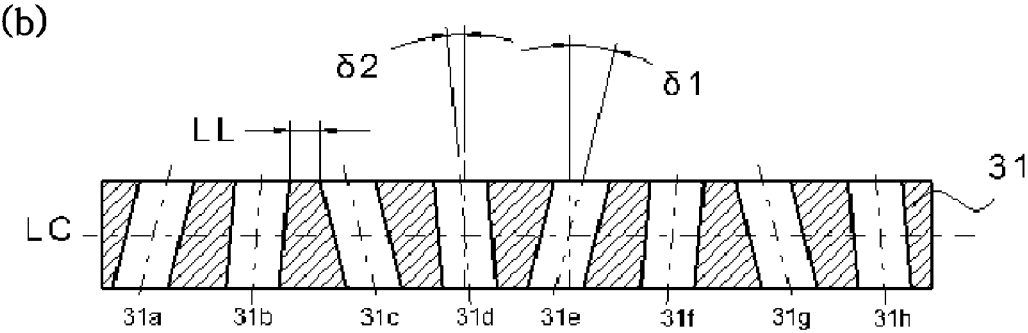
Figure 5:
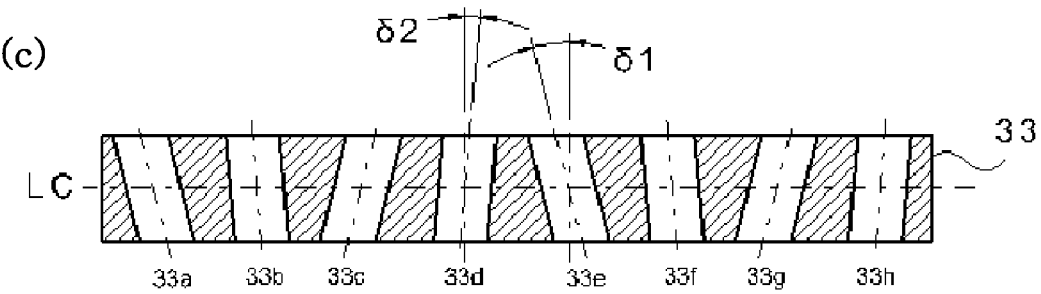

With reference to FIG. 5, one preferred embodiment of the present invention is described below in details. In this embodiment, the cross groove joint includes an outer joint member 31 having a plurality of (i.e., eight) inwardly facing outer ball grooves 31a-31h, and an inner joint member 33 placed inside the outer joint member 31 and having a plurality of (i.e., eight) outwardly facing inner ball grooves 33a-33h. The corresponding outer and inner ball grooves 31a-31h and 33a-33h face each other in pairs with each of the eight balls (not shown in FIG. 5) retained between each pair for torque transfer between the inner and outer joint members 31 and 33. The cross groove joint further includes a cage (not shown in FIG. 5) containing eight cage windows (not shown in FIG. 5) for retaining the balls therein and to transmit the rotational torque between the outer and inner joint members as is similar to that shown in FIG. 4. However, unlike the conventional cross groove joint as shown in FIG. 4, having the grooves alternately disposed in opposite directions with the same inclination angle δ, the ball grooves 31a-31h and 33a-33h of the outer and inner joint members have different groove shapes as shown in FIGS. 5(b) and 5(c).

More specifically, in the present embodiment the shapes of the ball grooves are differentiated in two groups as illustrated in FIG. 5. In particular, a first group of grooves, namely, four ball grooves 31a, 31c, 31e, 31g of the outer joint member 31 (displaced to each other with the phase angle of 90 degree) and four ball grooves 33a, 33c, 33e, 33g of the inner joint member 33 (displaced to each other with the phase angle of 90 degree) each have a skewed groove with a first skew angle δ1 throughout the length of the groove, but alternately arranged in opposite directions. On the other hand, a second group of grooves, namely, the remaining four ball grooves 31b, 31d, 31f, 31h of the outer joint member 31 and the remaining four ball grooves 33b, 33d, 33f, 33h of the inner joint member 33 each have a skewed groove with a second skew angle δ2 throughout the length of the groove, but alternately arranged in opposite directions. Here, the second skew angle δ2 is selected to have an angle less than the first skew angle δ1 which is in turn selectable depending on the desired design of the joint system, and is generally the same as or similar to, and not exceeding, the skew angle of the conventional cross groove joint (as shown in FIG. 4 for example). More specifically, according to one preferred embodiment, the first skew angle δ1 is selected to be in the range between about 10 degree and about 20 degree, and the second skew angle δ2 is selected to be in the range between about 1 degree and about 10 degree, more preferably between about 2 degree and about 6 degree. With such a differentiated groove configuration, combined with one set of grooves of a bigger skew angle (similar to the conventional skew angle) and another set of grooves of a smaller skew angle, the minimum thickness (the least effective thickness) LL of the outer and inner joint members 31 and 33 can be increased than that of the conventional cross groove joint as shown in FIG. 4. As a result, the ball movements in the cross groove joint and the size of cage windows can be reduced due to the grooves of reduced skew angle, while enlarging the thickness of cage webs as compared to that shown in FIG. 4. Accordingly, the cross groove joint of the present embodiment can enhance the mechanical strength and durability of the joint as compared to the conventional joint.

As explained above, the above-described embodiment of FIG. 5 is advantageous over the conventional cross groove joint. More particularly, as the second group of grooves of the outer and inner joint members 31 and 33 are configured to have a reduced skew angle δ2 which is smaller than the first or regular skew angle δ1 of the first group, the minimum thickness (the least effective thickness) LL of the outer and inner joint members 31 and 33 is increased, and thus, the mechanical strength and durability of the joint is also improved over the conventional joint.

However, as the grooves include two different skew angles, it may cause a transmission irregularity or frictions due to the difference in the rotational backlash in the first and second groove groups as the balls reciprocate in the ball grooves. The rotational backlash occurs due to the presence of clearances produced from the difference in dimension between the ball and ball groove. As the first and second groove groups have different skew angles, when the joint is operated and starts transferring the rotational torque in a reverse direction to cause the opposite sides of the groove surfaces to be in contact with the balls, the four ball grooves with bigger skew angle make the first contacts with the corresponding four balls, and then the remaining four ball grooves with relatively smaller skew angle make the next contacts with the remaining four balls, and thus, causing the difference in the rotational backlash. This uneven or non-simultaneous contact may cause to decrease the durability of the joint, based on the possibility that a load is not distributed to all eight balls at the same time under the torque, and thus, also to decrease a transmission efficiency of the joint in operation.

In order to solve the above-identified potential drawbacks, the applicants discovered that such rotational backlash can be decreased as the contact angle between the ball and the ball groove for the inner and outer joint members increases and as the skew angle of the ball grooves increases. The applicants further discovered that the rotational backlash can also be decreased as the pitch circle diameter (PCD) increases.

Based on these findings, the applicants further discovered several effective ways (as described below in details with reference to FIGS. 6-11) to reduce the rotational backlash in the ball grooves, while also maintaining a similar or equivalent strength and durability of the joint as that of the previously described embodiment of FIG. 5.

Figure 6:
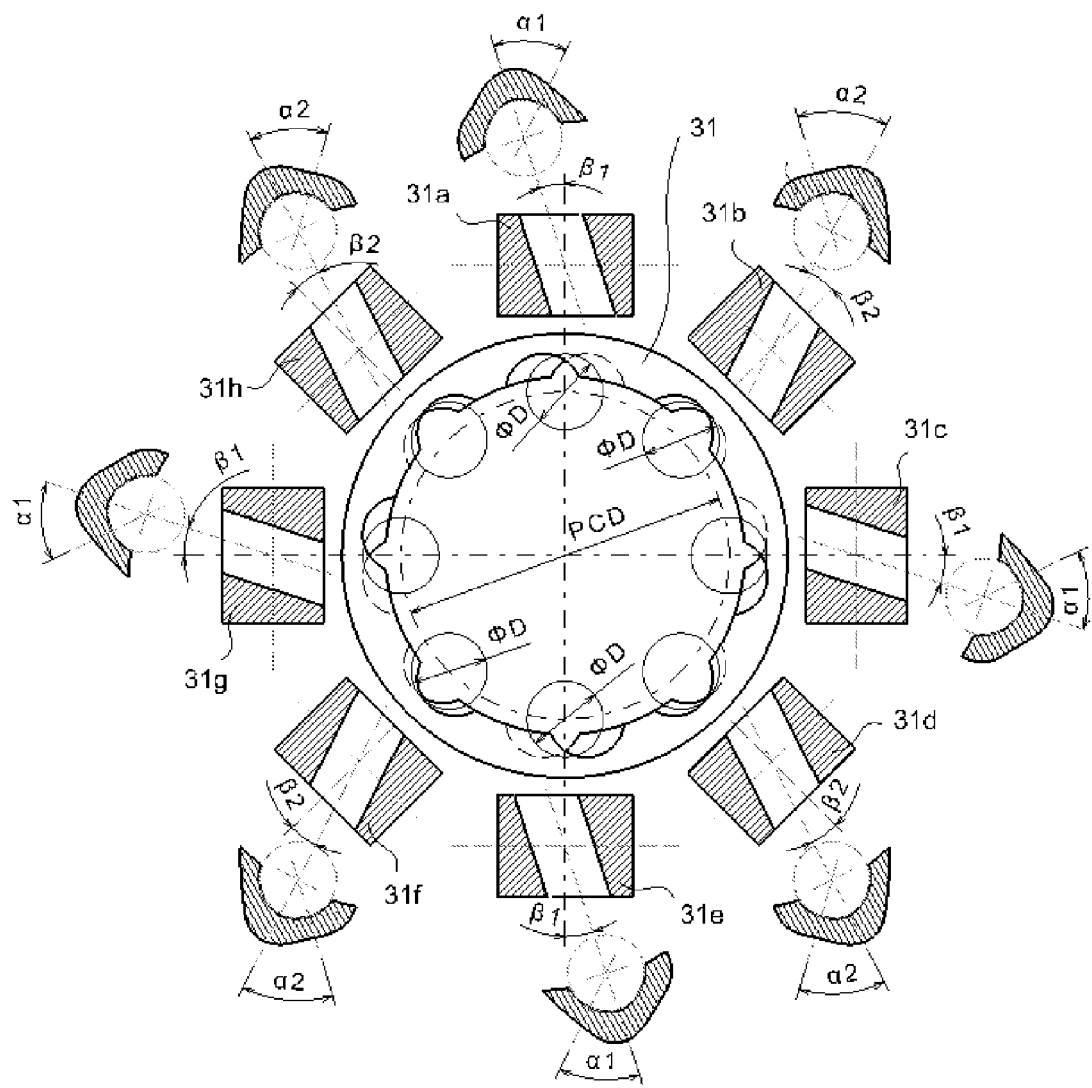
FIG. 6 is a view illustrating the outer joint member of the cross groove type constant velocity joint with eight balls, together with sectional views thereof taken in a radial direction and illustrating its groove shapes, constructed according to another preferred embodiment of the present invention.
Figure 7:
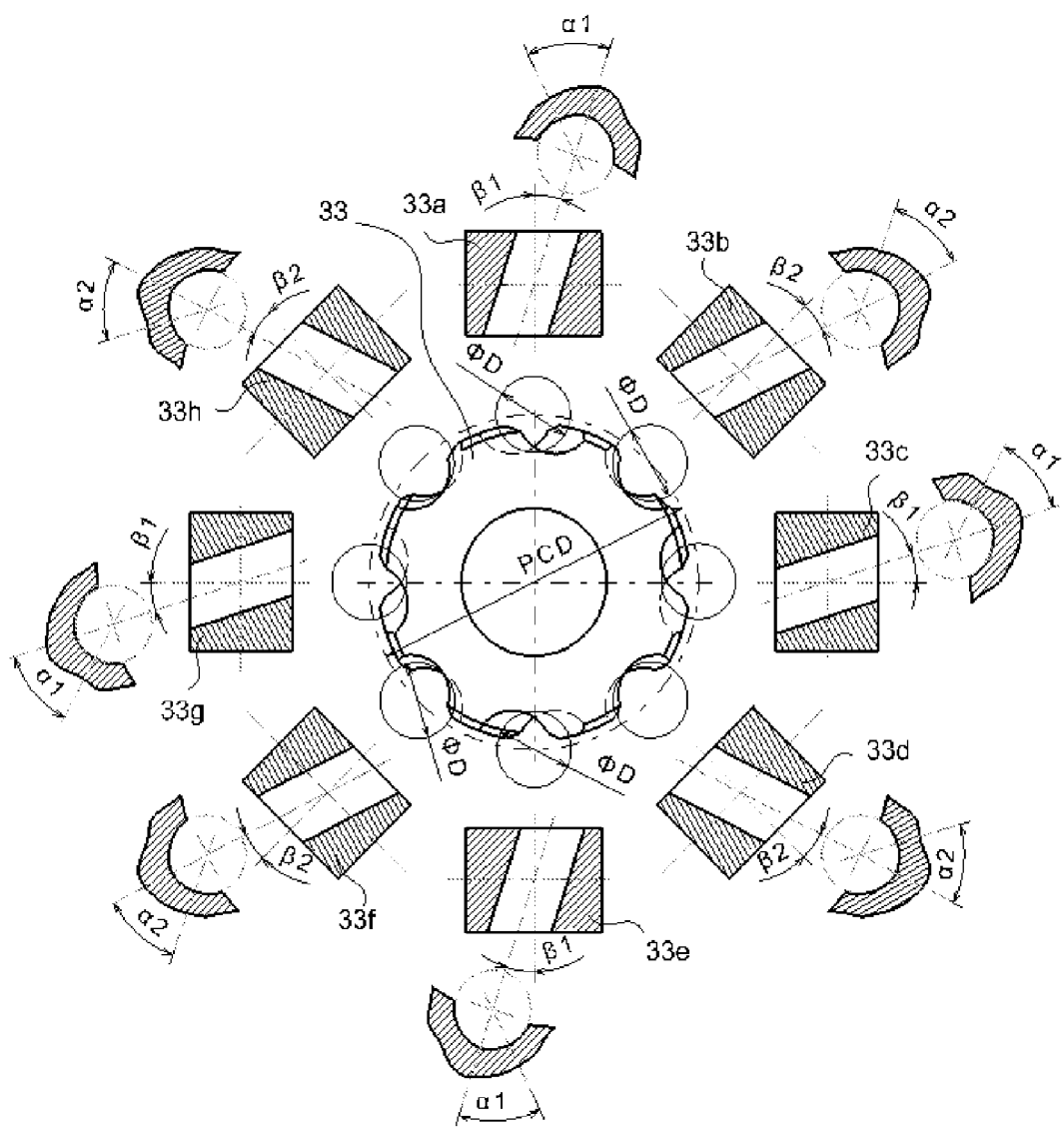
FIG. 7 is a view illustrating the inner joint member of the cross groove type constant velocity joint with eight balls, together with sectional views thereof taken in a radial direction and illustrating its groove shapes, which is to couple with the outer joint member of FIG. 6.
Figure 8:
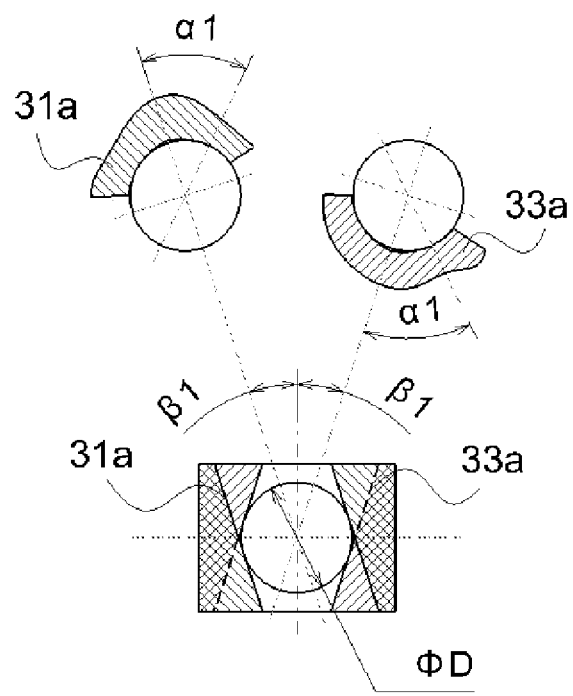
FIGS. 8(a)-8(b) are a cross-sectional view illustrating the groove shapes of the first group of grooves, and a cross-sectional view illustrating the groove shapes of the second group of grooves of the cross groove type constant velocity joint of FIGS. 6-7.
Figure 8:
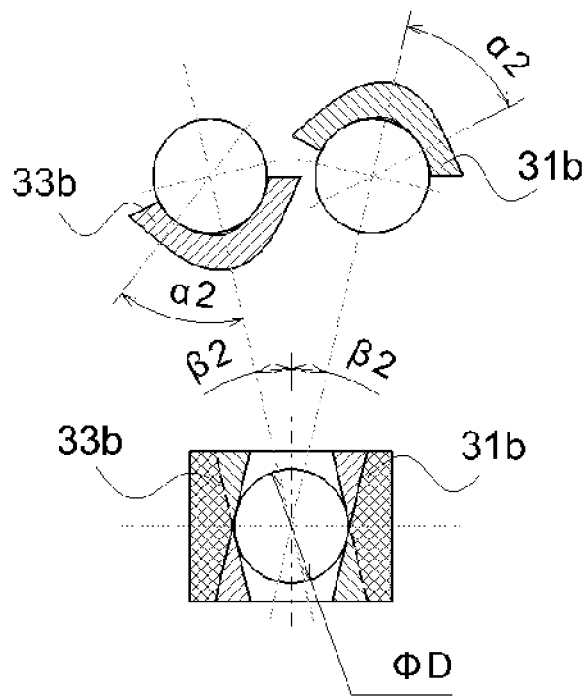

With reference to FIGS. 6-8, one preferred embodiment of the present invention is described below in details. Except that described below, the basic structure of this joint is similar to that described shown in association with FIG. 5 above, and detailed descriptions regarding to the common elements and structure of this embodiment are to be omitted herein for simplicity purposes, and to be referred above.

As is similar to the previous embodiment of FIG. 5, and unlike the conventional cross groove joint as shown in FIG. 4 (which has the grooves alternately disposed in opposite directions with the same inclination angle δ), the ball grooves 31a-31h and 33a-33h of the outer and inner joint members of the present embodiment have differentiated shapes or configurations as described below.

More specifically, in this embodiment as illustrated in FIGS. 6-8, a first group of grooves, namely, four ball grooves 31a, 31c, 31e, 31g of the outer joint member 31 (displaced to each other with the phase angle of 90 degree) and four ball grooves 33a, 33c, 33e, 33g of the inner joint member 33 (displaced to each other with the phase angle of 90 degree) each have a skewed groove with a first skew angle β1 throughout the length of the groove, in which the ball grooves in each group are alternately arranged in opposite directions as shown. In addition, each groove of the first group is configured to have a first contact angle α1 between the ball and the ball groove as shown in FIGS. 6, 7, and 8(a).

On the other hand, a second group of grooves, namely, the remaining four ball grooves 31b, 31d, 31f, 31h of the outer joint member 31 and the remaining four ball grooves 33b, 33d, 33f, 33h of the inner joint member 33 each have a skewed groove with a second skew angle β2 throughout the length of the groove, in which the ball grooves in each group are alternately arranged in opposite directions as shown. In addition, each groove of the second group is configured to have a second contact angle α2 between the ball and the ball groove as shown in FIGS. 6, 7, and 8(b).

In this embodiment, the second skew angle β2 is selected to have an angle less than the first skew angle β1 which is in turn selectable depending on the desired design of the joint system, and is generally the same as or similar to, and not exceeding, the skew angle of the conventional cross groove joint (as shown in FIG. 4 for example). More specifically, according to one preferred embodiment, the first skew angle β1 is selected to be in the range between about 10 degree and about 20 degree, and the second skew angle β2 is selected to be in the range between about 1 degree and about 10 degree, more preferably, between about 2 degree and about 6 degree. Accordingly, as the outer and inner joint members include two different groove patterns, namely, with a first group of grooves of a bigger skew angle (similar to the conventional skew angle) and a second group of grooves of a smaller skew angle, the minimum thickness (the least effective thickness) LL of the outer and inner joint members 31 and 33 can be increased than that of the conventional cross groove joint as shown in FIG. 4. As a result, the ball movements in the cross groove joint and the size of cage windows can be reduced due to the grooves of reduced skew angle, while enlarging the thickness of cage webs as compared to that shown in FIG. 4. Accordingly, the cross groove joint of the present embodiment can enhance the mechanical strength and durability of the joint as compared to the conventional joint.

On the other hand, the second contact angle α2 is selected to have an angle larger than the first contact angle α1 which is in turn selectable depending on the desired design of the joint system, and is generally the same as or similar to the contact angle of the conventional cross groove joint (as shown in FIG. 4 for example). More specifically, according to one preferred embodiment, the first contact angle α1 is selected to be in the range between about 30 degree and about 45 degree, and the second contact angle α2 is selected to be 1 to 10 degree larger than the first contact angle α1, and thus, in the range between about 31 degree and about 55 degree.

As explained above, the rotational backlash can be decreased as the contact angle between the ball and the ball groove for the inner and outer joint members increases and as the skew angle of the ball grooves increases. Therefore, in the present embodiment the increased rotational backlash in the second group of grooves due to the decrease of the second skew angle β2 is offset by the decreased rotational backlash due to the increase of the second contact angle α2. Accordingly, the potential risk of increasing the rotational backlash due to the decrease of the second skew angle β2 (as may be occurring in the previous embodiment of FIG. 5, for example) is effectively resolved. Accordingly, the cross groove joint of the present embodiment can enhance the mechanical strength and durability of the joint as compared to the conventional joint, while also resolving the potential risk of the rotational backlash, and thus, reducing frictions and transmission errors in the joint causable by the rotational backlash when using two groups of skewed grooves with different skew angles.

Figure 9:
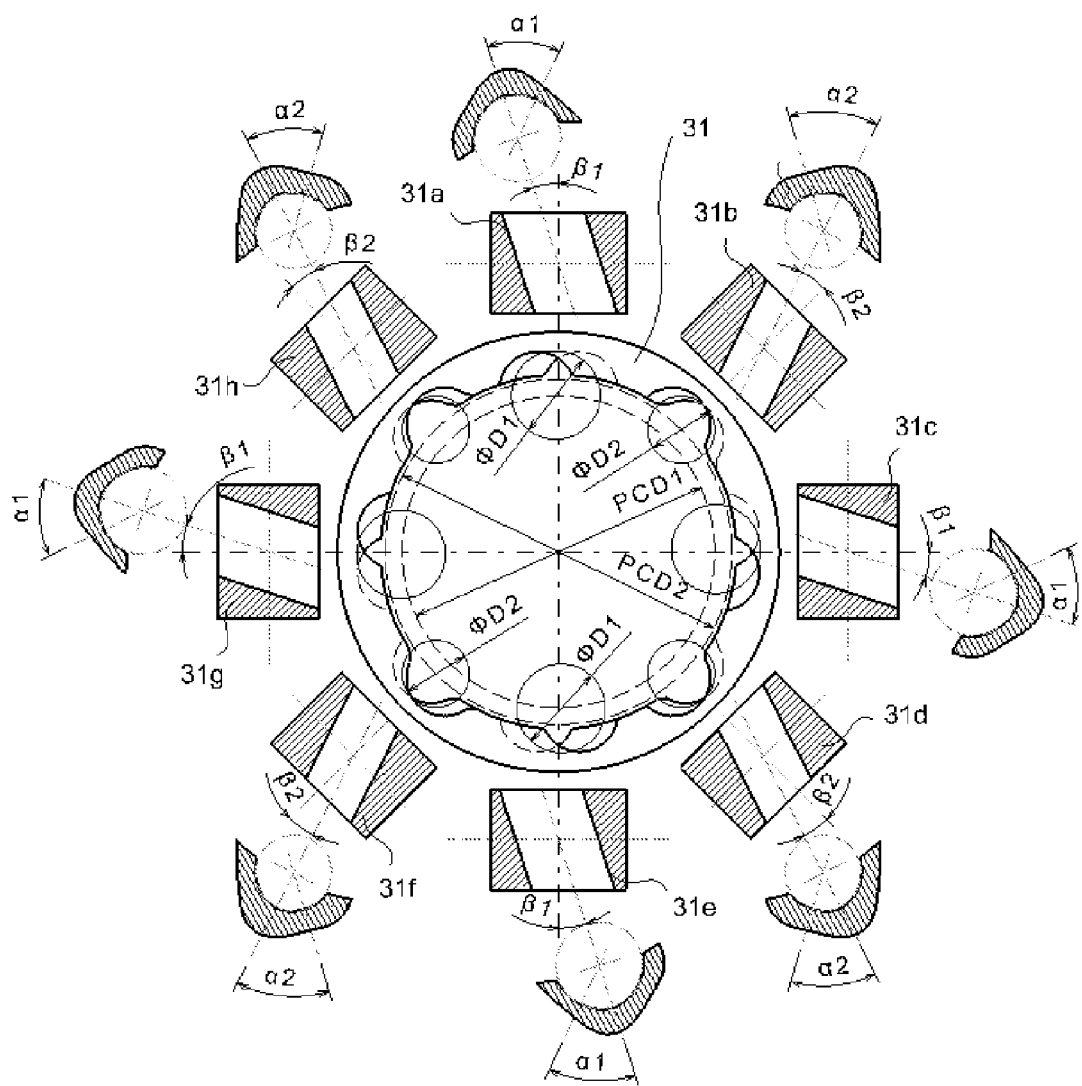
FIG. 9 is a view illustrating the outer joint member of the cross groove type constant velocity joint with eight balls, together with sectional views thereof taken in a radial direction and illustrating its groove shapes, constructed according to another preferred embodiment of the present invention.
Figure 10:
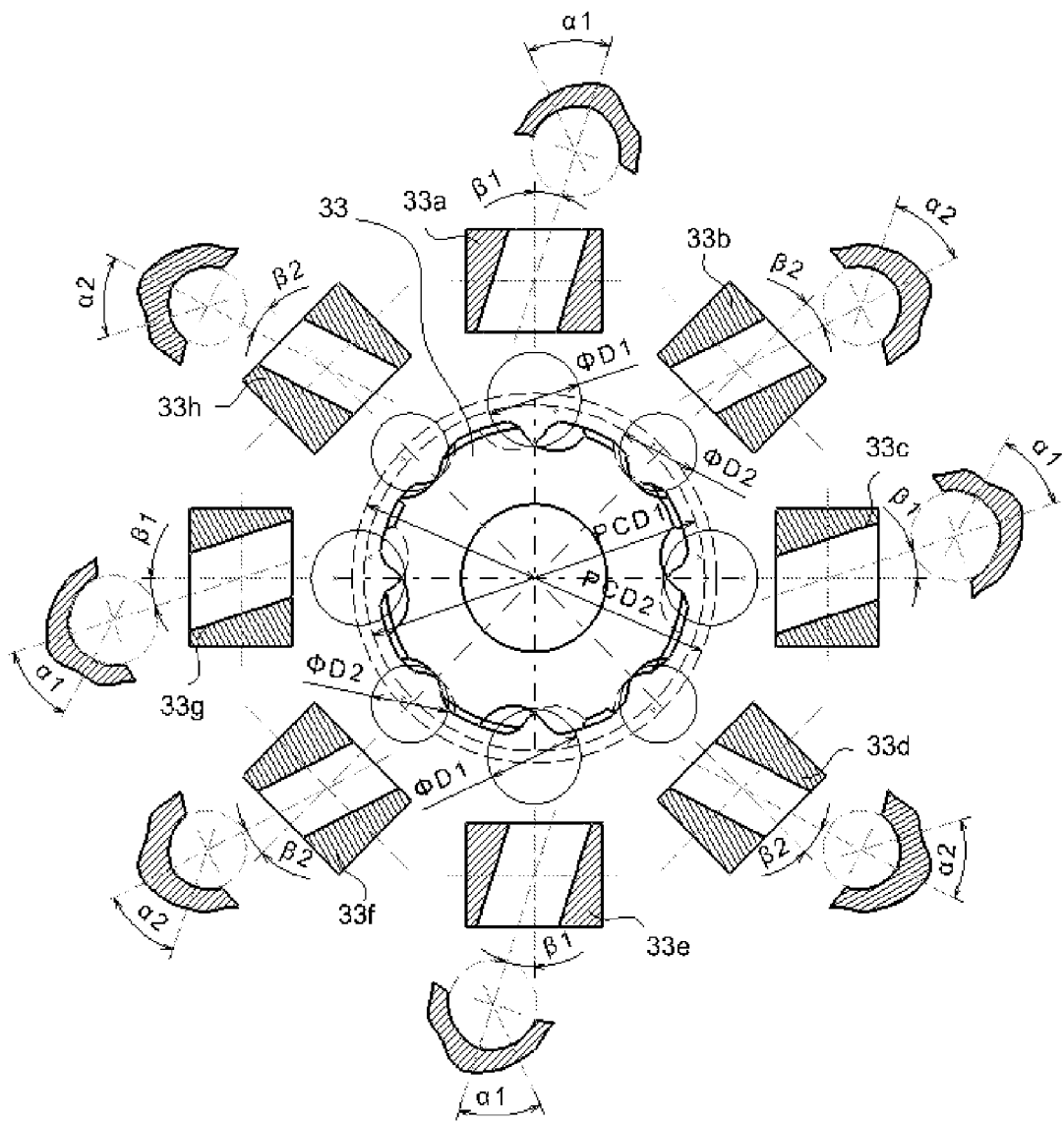
FIG. 10 is a view illustrating the inner joint member of the cross groove type constant velocity joint with eight balls, together with sectional views thereof taken in a radial direction and illustrating its groove shapes, which is to couple with the outer joint member of FIG. 9.
Figure 11:
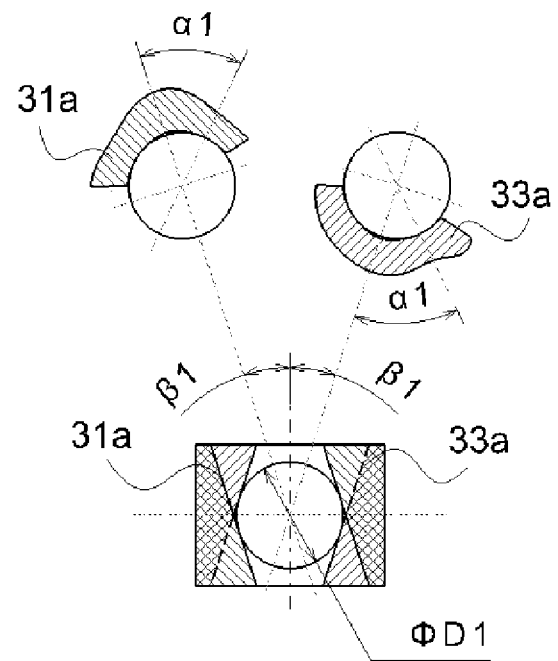
FIGS. 11(a)-11(b) are a cross-sectional view illustrating the groove shapes of the first group of grooves, and a cross-sectional view illustrating the groove shapes of the second group of grooves of the cross groove type constant velocity joint of FIGS. 9-10.
Figure 11:
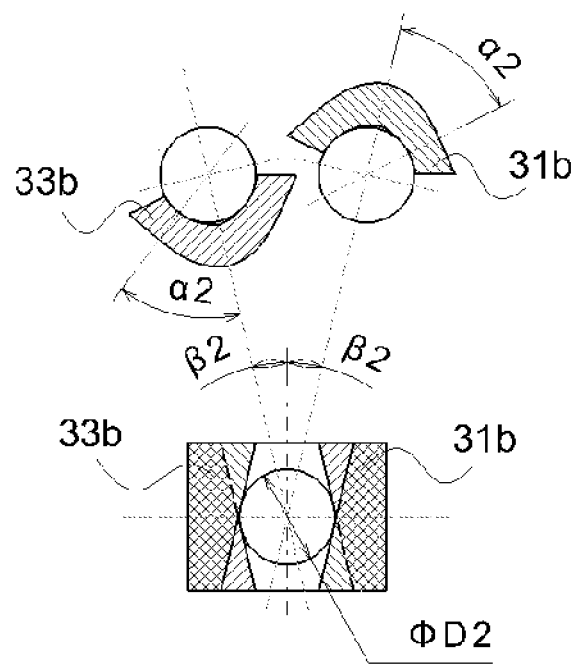

With reference to FIGS. 9-11, another preferred embodiment of the present invention is described below in details. The present embodiment includes common or similar features as that of the previous embodiment as described above in connection with FIGS. 6-8. However, the outer and inner joint members of the present embodiment also include different features and/or further modifications and as described below.

More specifically, in this embodiment as illustrated in FIGS. 9-11, a first group of grooves, namely, four ball grooves 31a, 31c, 31e, 31g of the outer joint member 31 (displaced to each other with the phase angle of 90 degree) and four ball grooves 33a, 33c, 33e, 33g of the inner joint member 33 (displaced to each other with the phase angle of 90 degree) each have a skewed groove with a first skew angle β1 throughout the length of the groove, in which the ball grooves in each group are alternately arranged in opposite directions as shown. In addition, each groove of the first group is configured to have a first contact angle α1 between the ball and the ball groove as shown in FIGS. 9, 10, and 11(*a*). Moreover, the pitch circle diameter (PCD) defined by the first group is configured to have a first pitch circle diameter PCD1.

On the other hand, a second group of grooves, namely, the remaining four ball grooves 31*b*, 31*d*, 31*f*, 31*h* of the outer joint member 31 and the remaining four ball grooves 33*b*, 33*d*, 33*f*, 33*h* of the inner joint member 33 each have a skewed groove with a second skew angle β2 throughout the length of the groove, in which the ball grooves in each group are alternately arranged in opposite directions as shown. In addition, each groove of the second group is configured to have a second contact angle α2 between the ball and the ball groove as shown in FIGS. 9, 10, and 11(*b*). Moreover, the pitch circle diameter (PCD) defined by the second group is configured to have a second pitch circle diameter PCD2 which is larger than the first pitch circle diameter PCD1 of the first group, and the size of the balls in the second group is selected to have a smaller dimension than the balls in the first group as shown in FIGS. 9-11.

In this embodiment, the second skew angle β2 is selected to have an angle less than the first skew angle β1 which is in turn selectable depending on the desired design of the joint system, and is generally the same as or similar to, and not exceeding, the skew angle of the conventional cross groove joint (as shown in FIG. 4 for example). More specifically, according to one preferred embodiment, the first skew angle β1 is selected to be in the range between about 10 degree and about 20 degree, and the second skew angle β2 is selected to be in the range between about 1 degree and about 10 degree, more preferably, between about 2 degree and about 6 degree. Accordingly, as the outer and inner joint members include two different groove patterns, namely, with a first group of grooves of a bigger skew angle (similar to the conventional skew angle) and a second group of grooves of a smaller skew angle, the minimum thickness (the least effective thickness) LL of the outer and inner joint members 31 and 33 can be increased than that of the conventional cross groove joint as shown in FIG. 4. As a result, the ball movements in the cross groove joint and the size of cage windows can be reduced due to the grooves of reduced skew angle, while enlarging the thickness of cage webs as compared to that shown in FIG. 4. Accordingly, the cross groove joint of the present embodiment can enhance the mechanical strength and durability of the joint as compared to the conventional joint.

The second contact angle α2 is selected to have an angle larger than the first contact angle α1 which is in turn selectable depending on the desired design of the joint system, and is generally the same as or similar to the contact angle of the conventional cross groove joint (as shown in FIG. 4 for example). More specifically, according to one preferred embodiment, the first contact angle α1 is selected to be in the range between about 30 degree and about 45 degree, and the second contact angle α2 is selected to be 1 to 10 degree larger than the first contact angle α1, and thus, in the range between about 31 degree and about 55 degree.

In addition, as stated above, the second pitch circle diameter PCD2 is selected to have a larger dimension than the first pitch circle diameter PCD1 which is in turn selectable depending on the desired design of the joint system, and is generally the same as or similar to the contact angle of the conventional cross groove joint. In addition, the size (ØD2) of the balls in the second group is selected to have a smaller dimension than the size (ØD1) of the balls in the first group as shown in FIGS. 9-11.

As explained above, the rotational backlash can be decreased as the contact angle between the ball and the ball groove for the inner and outer joint members increases, as the skew angle of the ball grooves increases, and also as the pitch circle diameter (PCD) increases. Therefore, in the present embodiment the increased rotational backlash in the second group of grooves due to the decrease of the second skew angle β2 is offset by the decreased rotational backlash due to the increase of the second contact angle α2. Moreover, the increased rotational backlash in the second group of grooves due to the decrease of the second skew angle β2, can be further offset by the decreased rotational backlash due to the increase of the second pitch circle diameter PCD2 and the reduced size of the balls in the second group.

Accordingly, the potential risk of increasing the rotational backlash due to the decrease of the second skew angle β2 (as may be occurring in the previous embodiment of FIG. 5) is effectively resolved. Accordingly, the cross groove joint of the present embodiment can enhance the mechanical strength and durability of the joint as compared to the conventional joint, while also resolving the potential risk of the rotational backlash, and thus, reducing frictions and transmission errors in the joint causable by the rotational backlash when using two groups of skewed grooves with different skew angles.

As described above in connection with several exemplary embodiments thereof, in order to provide an enhanced strength to the cage web and the cross groove joint, the present invention provides a cross groove joint including an outer joint member with a plurality of inwardly facing ball grooves and an inner joint member with a plurality of outwardly facing ball grooves, in which the shapes of the ball grooves of the outer and inner joint member are configured to increase the thickness and also the mechanical strength of the cage web as compared to the conventional cross groove joint, in particular, by applying different skew angles to the ball grooves of the cross groove joint, namely, a regular skew angle to a first group and a reduced skew angle to a second group. Moreover, the potential risk of increasing rotational backlash is effectively resolved by applying differentiated or modified configurations in the shapes (e.g., the contact angle) of the second group and/or the size of the pitch circle diameter and the ball size of the second group.

The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A constant velocity joint for a drive system comprising:
an outer joint member having a plurality of inwardly facing outer ball grooves, the outer ball grooves consisting of a first group of grooves, each groove of which having a skewed groove shape with a first skew angle (β1) other than zero and alternately arranged in opposite directions relative to an axis of rotation of outer joint member, and a second group of grooves, each groove of which having a skewed groove shape with a second skew angle (β2) other than zero and alternately arranged in opposite directions relative to an axis of rotation of outer joint member, the second skew angle (β2) being less than the first skew angle (β1);
an inner joint member disposed inside the outer joint member and having a plurality of outwardly facing inner ball grooves consisting of a first group of grooves, each groove of which having a skewed groove shape with a first skew angle (β1) other than zero and alternately arranged in opposite directions relative to an axis of rotation of inner joint member, and a second group of grooves, each groove of which having a skewed groove shape with a second skew angle (β2) other than zero and alternately arranged in opposite directions relative to an axis of rotation of inner joint member, the second skew angle (β2) being less than the first skew angle (β1), each inner ball groove of the inner joint member being coupled with a corresponding outer ball groove of the outer joint member generally in crossed pair;
a plurality of torque transfer balls which are guided by the ball groove faces of the outer and inner joint members; and
a cage having circumferentially displaced windows to accommodate the balls therein;
wherein the first group of grooves of the outer and inner joint members are configured to have a first contact angle (α1) between its ball and ball groove, respectively, and the second group of grooves of the outer and inner joint members are configured to have a second contact angle (α2) between its ball and ball groove, respectively, and wherein the second contact angle (α2) is selected to have an angle larger than the first contact angle (α1);
wherein the first group of grooves of the outer and inner joint members are configured to have a first pitch circle diameter (PCD1), and the second group of grooves of the outer and inner joint members are configured to have a second pitch circle diameter (PCD2), and wherein the second pitch circle diameter (PCD2) is larger than the first pitch circle diameter (PCD1);
wherein the balls received in the second group of grooves of the outer and inner joint members are smaller than the balls received in the first group of grooves of the outer and inner joint members;
wherein the number of the torque transfer balls is an even number.

2. A constant velocity joint for a drive system comprising:
an outer joint member having a plurality of inwardly facing outer ball grooves, the outer ball grooves consisting of a first group of grooves, each groove of which having a skewed groove shape with a first skew angle (β1) other than zero and alternately arranged in opposite directions relative to an axis of rotation of outer joint member, and a second group of grooves, each groove of which having a skewed groove shape with a second skew angle (β2) other than zero and alternately arranged in opposite directions relative to an axis of rotation of outer joint member, the second skew angle (β2) being less than the first skew angle (β1);
an inner joint member disposed inside the outer joint member and having a plurality of outwardly facing inner ball grooves consisting of a first group of grooves, each groove of which having a skewed groove shape with a first skew angle (β1) other than zero and alternately arranged in opposite directions relative to an axis of rotation of inner joint member, and a second group of grooves, each groove of which having a skewed groove shape with a second skew angle (β2) other than zero and alternately arranged in opposite directions relative to an axis of rotation of inner joint member, the second skew angle (β2) being less than the first skew angle (β1), each inner ball groove of the inner joint member being coupled with a corresponding outer ball groove of the outer joint member generally in crossed pair;
a plurality of torque transfer balls which are guided by the ball groove faces of the outer and inner joint members; and
a cage having circumferentially displaced windows to accommodate the balls therein;
wherein the first group of grooves of the outer and inner joint members are configured to have a first contact angle (α1) between its ball and ball groove, respectively, and the second group of grooves of the outer and inner joint members are configured to have a second contact angle (α2) between its ball and ball groove, respectively, and wherein the second contact angle (α2) is selected to have an angle larger than the first contact angle (α1);
wherein the first group of grooves of the outer and inner joint members are configured to have a first pitch circle diameter (PCD1), and the second group of grooves of the outer and inner joint members are configured to have a second pitch circle diameter (PCD2), and wherein the second pitch circle diameter (PCD2) is larger than the first pitch circle diameter (PCD1);
wherein the balls received in the second group of grooves of the outer and inner joint members are smaller than the balls received in the first group of grooves of the outer and inner joint members;
wherein the first group of grooves of the outer and inner joint members, respectively, consist of four ball grooves displaced to one another with a phase angle of 90 degree, and the second group of grooves of the outer and inner joint members, respectively, consist of four ball grooves displaced to one another with a phase angle of 90 degree.

3. A constant velocity joint for a drive system comprising:
an outer joint member having a plurality of inwardly facing outer ball grooves, the outer ball grooves consisting of a first group of grooves, each groove of which having a skewed groove shape with a first skew angle (β1) other than zero and alternately arranged in opposite directions relative to an axis of rotation of outer joint member, and a second group of grooves, each groove of which having a skewed groove shape with a second skew angle (β2) other than zero and alternately arranged in opposite directions relative to an axis of rotation of outer joint member, the second skew angle (β2) being less than the first skew angle (β1);
an inner joint member disposed inside the outer joint member and having a plurality of outwardly facing inner ball grooves consisting of a first group of grooves, each groove of which having a skewed groove shape with a first skew angle (β1) other than zero and alternately arranged in opposite directions relative to an axis of rotation of inner joint member, and a second group of grooves, each groove of which having a skewed groove shape with a second skew angle (β2) other than zero and alternately arranged in opposite directions relative to an axis of rotation of inner joint member, the second skew angle (β2) being less than the first skew angle (β1), each inner ball groove of the inner joint member being coupled with a corresponding outer ball groove of the outer joint member generally in crossed pair;
a plurality of torque transfer balls which are guided by the ball groove faces of the outer and inner joint members; and
a cage having circumferentially displaced windows to accommodate the balls therein;
wherein the first group of grooves of the outer and inner joint members are configured to have a first contact angle (α1) between its ball and ball groove, respectively, and the second group of grooves of the outer and inner joint members are configured to have a second contact angle (α2) between its ball and ball groove, respectively, and wherein the second contact angle (α2) is selected to have an angle larger than the first contact angle (α1);

wherein the first group of grooves of the outer and inner joint members are configured to have a first pitch circle diameter (PCD1), and the second group of grooves of the outer and inner joint members are configured to have a second pitch circle diameter (PCD2), and wherein the second pitch circle diameter (PCD2) is larger than the first pitch circle diameter (PCD1);

wherein the balls received in the second group of grooves of the outer and inner joint members are smaller than the balls received in the first group of grooves of the outer and inner joint members;

wherein the first skew angle of the outer joint member and the first skew angle of the inner joint member are selected to be in the range between about 10 degree and about 20 degree, and the second skew angle of the outer joint member and the second skew angle of the inner joint member are selected to be in the range between about 1 degree and about 10 degree.

4. The constant velocity joint of claim 3, wherein the first contact angle of the outer joint member and the first contact angle of the inner joint member are selected to be in the range between about 30 degree and about 45 degree, and the second contact angle of the outer joint member and the second contact angle of the inner joint member are selected to be 1 to 10 degree larger than the first contact angle of the outer and inner joint members.

* * * * *